United States Patent
Tults

(10) Patent No.: US 6,339,451 B1
(45) Date of Patent: Jan. 15, 2002

(54) GRAPHICAL ON-SCREEN DISPLAY SYSTEM

(75) Inventor: Juri Tults, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/254,961

(22) PCT Filed: Oct. 7, 1997

(86) PCT No.: PCT/US97/16273

§ 371 Date: Mar. 22, 1999

§ 102(e) Date: Mar. 22, 1999

(87) PCT Pub. No.: WO98/16063

PCT Pub. Date: Apr. 16, 1998

Related U.S. Application Data

(60) Provisional application No. 60/026,996, filed on Oct. 7, 1996.

(30) Foreign Application Priority Data

Oct. 11, 1996 (GB) ............................................. 9621255

(51) Int. Cl.[7] ................................................. H04N 5/50
(52) U.S. Cl. ..................... 348/569; 348/625; 382/266; 382/269; 345/611
(58) Field of Search ................................ 348/569, 563, 348/600, 589, 625; 382/266, 269; 345/611, 613; H04N 5/50

(56) References Cited

U.S. PATENT DOCUMENTS

| | | | |
|---|---|---|---|
| 4,953,027 A | 8/1990 | Tong et al. ................. 358/188 |
| 5,293,579 A | 3/1994 | Stockholm .................... 382/22 |
| 5,396,297 A * | 3/1995 | Shindon et al. ............. 348/569 |
| 5,812,139 A * | 9/1998 | Morimoto .................... 345/136 |
| 5,966,475 A * | 10/1999 | Koon et al. ................. 382/266 |
| 6,141,460 A * | 10/2000 | Amer et al. ................. 382/266 |
| 6,148,115 A * | 11/2000 | Mackinnon et al. ........ 382/266 |

FOREIGN PATENT DOCUMENTS

| EP | 0177704 | 4/1986 | ............ H04N/7/08 |
|---|---|---|---|
| EP | 0651571 | 5/1995 | .......... H04N/5/445 |

OTHER PUBLICATIONS

N.F. Hurley "A Single Chip Line 21 Captioning Decoder", Aug. 1, 1992 IEEE Transactions on Consumer Electronics, vol. 38, Nr. 3, pp. 261–267.

* cited by examiner

*Primary Examiner*—Michael Lee
(74) *Attorney, Agent, or Firm*—Joseph S. Tripoli; Robert D. Shedd

(57) ABSTRACT

A graphical on-screen display (OSD) system, includes a decoder for decoding graphical OSD image representative data from an auxiliary information component of a video signal. An edge detector is coupled to the decoder and processes the OSD image representative data to detect an edge in the graphical OSD image. An edge smoother is coupled to both the decoder and the edge detector and generates signals representing a reproduced OSD image having a smoothed edge when an edge is detected.

12 Claims, 6 Drawing Sheets

GRAPHICAL ON-SCREEN DISPLAY SYSTEM

This application is a 371 of PCT/US97/16273 filed Oct. 7, 1997 which claims benefit of No. 60/026,996 filed Oct. 7, 1996.

FIELD OF THE INVENTION

The subject invention concerns the field of OSD systems for a television receiver.

BACKGROUND OF INVENTION

The term "television receiver" as used herein includes television receivers having a display device (commonly called "television sets"), and television receivers not having a display device, such as VCRs, videodisc players, digital videodisc units (DVD), cable converter boxes, satellite receivers, and the like.

Services such as closed captioning, XDS (Extended Data Service) and Starsight® transmit data to television receivers within predetermined undisplayed (blanked) television horizontal line intervals. Television receivers include a signal processor or decoder, e.g., a microprocessor, microcomputer, or microcontroller, that extracts the auxiliary information component. An example is a closed caption decoder. The auxiliary information component of a television signal has heretofore consisted largely of text and control characters. It has been proposed that graphics data also be sent via an auxiliary information component of a television signal using data protocols such as those used for closed captioning, XDS and Starsight® data.

In such a system, a graphical on-screen display (OSD) system in a television receiver receives a graphic image representative signal from a transmitter. The graphic image is partitioned into an array of picture elements (pixels). The pixel array contains a predetermined number of rows, each row containing a predetermined number of pixels. The image representative signal includes sequential data values representing the colors of respective pixels in the array. Each sequential data value points to a location in a color palette. The locations in the color palette, in turn, contain data representing the desired color for the corresponding pixel. The color representative data is processed by an OSD controller in the television receiver to condition the television receiver to display a pixel of the desired color.

For example, the StarSight® system will have the capability of producing graphic images on the TV screen. These images comprise an array of approximately square pixels where each pixel has a height of 2 TV scan lines. The active area of a typical NTSC TV screen, with 3:4 aspect ratio, can be filled by about 86,400 (240×360) pixels. Because auxiliary information such as StarSight® data is transmitted using a relatively low bandwidth protocol similar to closed captioning, the time required to transmit a full screen graphic image would be unacceptably long. Therefore, the maximum size of a graphic image may be limited to less than 5% of the screen area which permits transmission to occur within an acceptable period of time. Recent proposals call for data representing each pixel to be transmitted as a 4 bit binary value specifying 1 of 16 possible colors for that pixel. Each received data value represents the address in a sixteen entry color palette where data representing the specified one of 16 possible colors used in any given graphic image has previously been stored in binary format.

Closed caption text displayed on screens of existing TV receivers, e.g., those manufactured by Thomson Consumer Electronics, Inc., are made up of pixels which are about the same size as those proposed to make up the graphic images in the proposed StarSight system. It is well known that diagonal strokes of characters like A and W in the closed caption text images look somewhat ragged and coarse on the TV screen. To improve the appearance of diagonal character strokes, the textual OSD controller hardware in such television receivers has been designed to smooth these strokes by generating and appropriately placing along the diagonals small, or rounding, pixels of ¼ the size of normal pixels, i.e., having a height of one scan line and a width one-half the width of the normal pixels. The displayed character images are made up of both normal foreground pixels and small, half-size, rounding foreground pixels of one color constituting the strokes of the character, and "background" pixels of a different color surrounding the foreground pixels. The rounding pixels are always generated in the "foreground" color. This operation may be easily accomplished in current textual on-screen display (OSD) controllers, because they "know" that a character is being drawn, "know" what that character is, and "know" where to add the rounding dots in that character image to make the most pleasing character image. An example of a display system capable of displaying text characters and of displaying graphics using stored graphics "primitives" is described in EP 0651571. An example of a display system that provides for rounding or smoothing of diagonal edges is described in "A Single Chip Line 21 Captioning Decoder", N. F. Hurley, IEEE Transactions on Consumer Electronics, vol. 38, no. 3, pages 261–267.

However, when a graphical image, which may include image elements representing textual characters as well as other graphic objects, is transmitted to the television receiver, the OSD controller has no such knowledge. The low resolution of the graphics image represented by the transmitted signal does not, by itself, provide the level of detail needed to produce pleasing smoothed, rounded, character, or other edges in the graphic elements. The proposed graphical display, however, would also benefit from application of suitable edge smoothing. For best results, the rules for generating rounding elements are more complex for graphics, because generally more than 2 colors are involved and the concept of "foreground" and "background" may not be relevant. Also, rounding may be undesirable in some situations.

SUMMARY OF THE INVENTION

A graphical on-screen display (OSD) system incorporating the invention processes an auxiliary information component of a television signal and includes an edge detector for determining that a textual or other graphical edge is present in a graphical image. The system further includes an edge smoother for determining whether the detected edge is to be smoothed or rounded, or is not. In addition, the system automatically determines the proper location and color for the smoothing pixels without prior knowledge of the image element shape. The smoothing pixels may be any color in the color palette.

DETAILED DESCRIPTION

Figure 2:
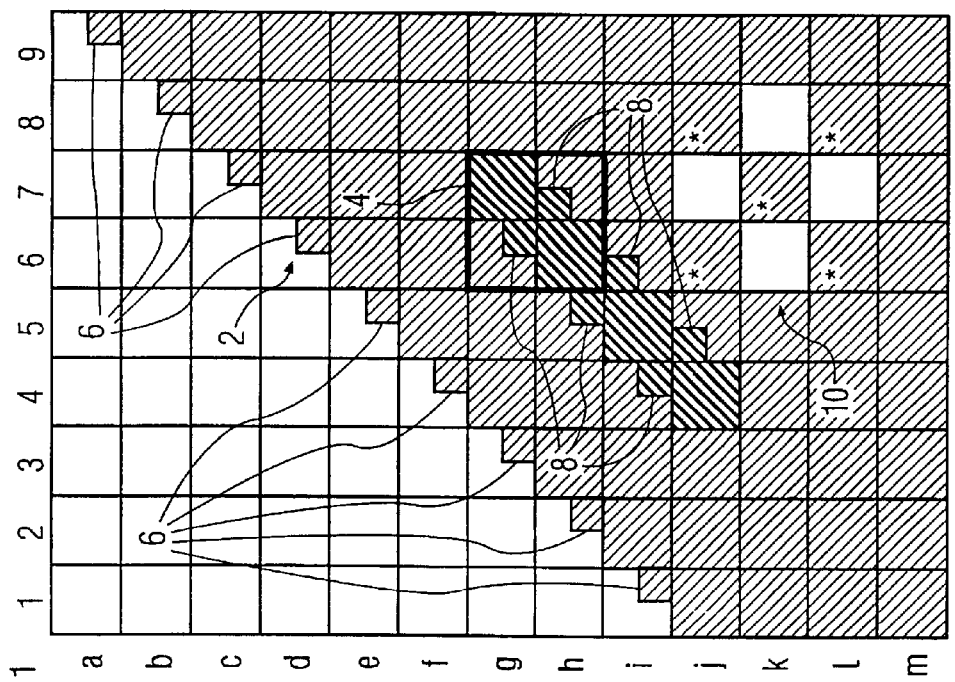
FIGS. 1 and 2 are pictorial diagrams useful in understanding the present invention.
Figure 1:
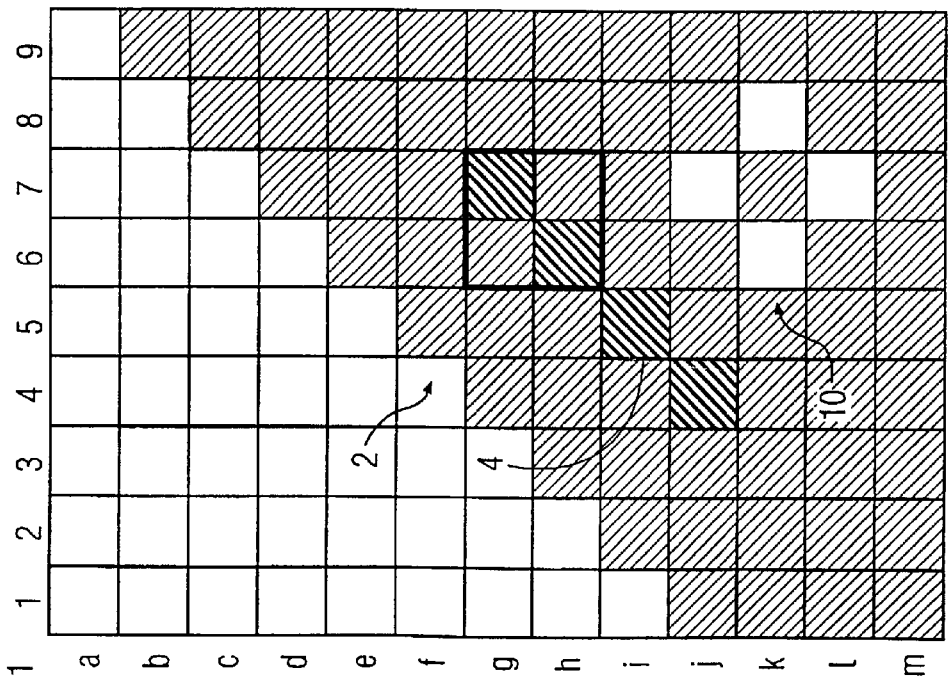

FIGS. 1 and 2 are pictorial diagrams useful in understanding the present invention. FIGS. 1 and 2 show a portion 1 of an array of pixels making up a graphical image, each pixel represented by a square. The array portion 1 illustrated in FIGS. 1 and 2 consist of 13 rows, designated "a" through "m", each row containing nine pixels "1" through "9". The illustrated image portion contains 3 colors. Color 1 is illustrated by double crosshatching, color 2 is illustrated by single crosshatching, and color 3 is illustrated by no crosshatching. By application of appropriate rounding rules by a graphical OSD controller, described in more detail below, this array can be displayed as illustrated in FIG. 2. The long diagonal border 2 between colors 2 and 3 may be smoothed by generating ¼ size rounding pixels 6 of color 2, and the narrow diagonal line 4 of color 1 within the color 2 area is smoothed by generating rounding pixels 8 of color 1. However, in case of the four elements 10 of color 3 in the lower right area of the array, rounding pixels must not be generated because, in this case, it is important to retain the appearance of the original pattern. Notice that for best results, rounding elements may be any of the colors in the color palette.

As described above, the color of every pixel in the image array is specified in the received signal by a four bit vector which points to one of 16 entries in a color palette containing data representing that color. The entries in the color palette contain bit patterns which are preloaded into the color palette by software according to current requirements. The bit patterns may be preloaded by the receiver automatically, or may be supplied to the color palette via data in the television signal received by the television receiver from the transmitting location. For example, each entry in the color palette may contain a six bit entry in which two bits are allocated to specify the magnitude of each of red, green and blue color components which, when combined, make up a displayed pixel of that color.

Figure 4:
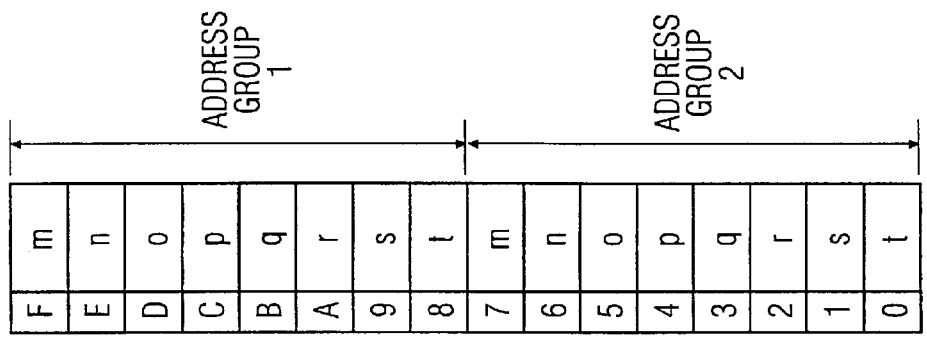
FIGS. 3 and 4 are memory layout diagrams illustrating color palettes which may be used in the present invention.
Figure 3:
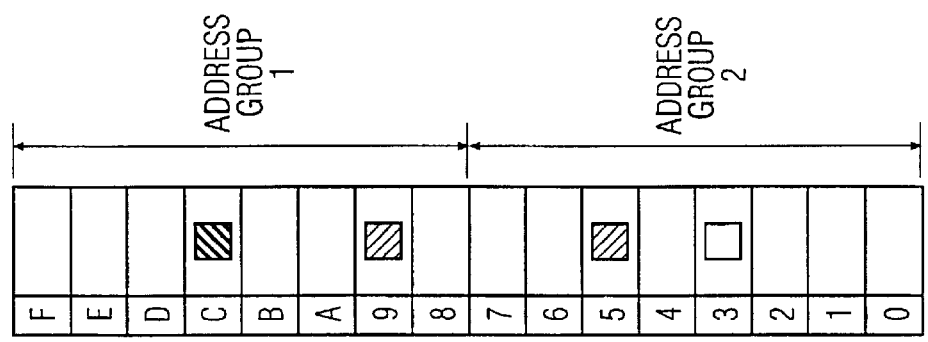

FIGS. 3 and 4 are memory layout diagrams illustrating color palettes 20 which may be used in the present invention. In FIGS. 3 and 4, the 16 entries in the color palette 20 are represented by corresponding rectangles, with addresses labeled in hexadecimal from 0 to F. In FIG. 3, data representing color 1 (double cross hatched) is contained in entry C, data representing color 2 (single crosshatched) is contained in two entries: entry 9 and entry 5, for reasons described in more detail below, and data representing color 3 (no crosshatching) is contained in entry 3.

In order to have a flexible rounding algorithm, i.e., one which is operative when it is desired to smooth an edge and inoperative when smoothing is not desired, the present invention divides the 16 color entries in the color palette into two groups, termed address groups 1 and 2 in FIGS. 3 and 4. According to the present invention, rounding pixels will be generated only when an edge is detected formed by pixels having one of the colors in address group 1, while the adjacent pixel is one of the colors in address group 2. Otherwise, no rounding is performed. By associating the color vectors describing the array of FIG. 1 with the color palette 20 arrangement in FIG. 3, the desired display shown in FIG. 2 can be generated.

Because color 2 (single crosshatched) forms one edge with color 3 (no crosshatching) which is to be smoothed, i.e., diagonal edge 2, and another edge with color 3 which is not to be smoothed, i.e., with pattern 10 in the lower right corner of the display, the entry for color 2 must be stored in both address group 1 and address group 2 in the color palette 20, as illustrated in FIG. 3. Specifically, in order not to generate rounding pixels surrounding the pattern 10, the color 2 pixels surrounding the pattern 10: j6, j8, k7, 16, and 18 (marked with asterisks in FIG. 2), are designated in the received signal by vectors pointing to address 5 of the color palette 20. Because this entry is in the address group 2, no smoothing will be generated by the OSD controller among these pixels. The remaining pixels of color 2 are designated in the received signal by a vector pointing to address 9 of the color palette 20. Because this entry is in address group 1, while the color palette entry for color 3 is in address group 2, smoothing will be generated by the OSD controller among these pixels. All pixels of color 1 (double crosshatched) may be designated in the received signal by a vector pointing to address C of the color palette 20. Because this entry is in address group 2, smoothing will be generated along the edge between the pixels of color 1 and color 2.

To allow for maximum flexibility in rounding involving all of the colors assigned to the array pixels, the colors assigned to the two address groups in the color palette 20 may be made identical as shown in FIG. 4. In FIG. 4, colors designated "m" through "t" are assigned to color palette 20 addresses 7 through 0, respectively, and also to color palette 20 addresses F through 8, respectively. The number of colors used in any given image in such an arrangement is eight. It is also possible to include in the received data a global control bit that could be used to enable or disable the smoothing algorithm to select the desired operating mode.

Figure 5:
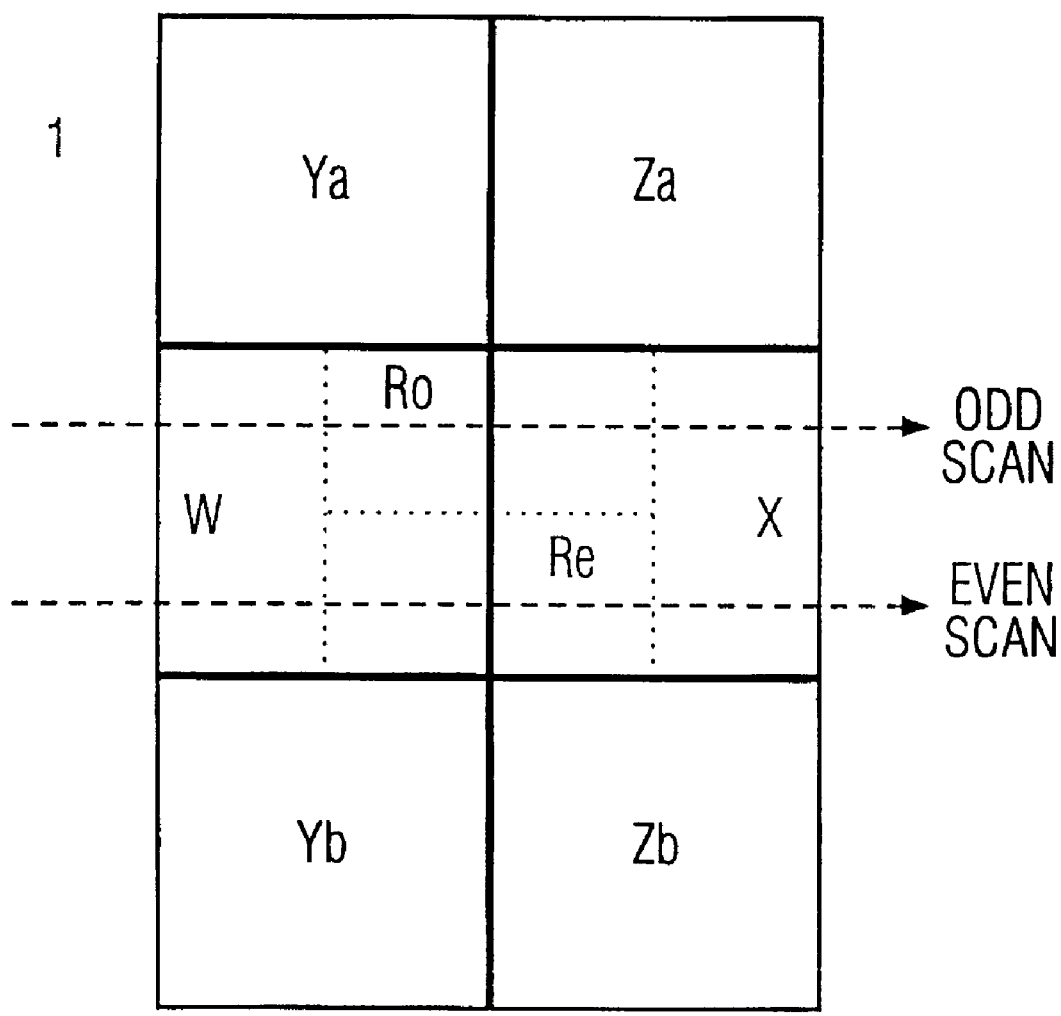
FIGS. 5 and 6 are pictorial diagrams useful in understanding the present invention.

Because the content of a graphical image is unknown a priori, the graphical OSD generator must analyze the received data to detect the location of edges and to determine whether those edges are to be smoothed, as described above. FIG. 5 is a pictorial diagram useful in understanding the operation of the present invention.

In FIG. 5, a smaller portion of the array 1 illustrated in FIGS. 1 and 2 is illustrated. Any individual pixel is displayed on the display device as portions of 2 adjacent scan lines with the upper scan line termed "odd" and the lower scan line termed "even", illustrated as dashed lines in FIG. 5. Data representing the graphical image pixels is received and the color vectors representing the respective pixels are stored in a display memory in locations corresponding to the location of the pixels in the graphical image. The OSD controller retrieves the data from the display memory, and conditions the display device to change color at pixel boundaries.

Referring to FIG. 5, pixels are represented by squares outlined with solid lines. The currently displayed pixel is designated W, and the pixel immediately to the right is designated X. likewise, the pixels displayed immediately above W and X are designated as Ya and Za, respectively, and the pixels displayed immediately below W and X are designated as Yb and Zb, respectively. To generate a rounding pixel, the OSD controller conditions the display device to produce a color change in the middle of a pixel cell in one of the two scan lines making up the pixel. This is illustrated in FIG. 5 by the dotted rectangle Ro, representing a rounding pixel generated by the odd scan line, and by the dotted rectangle Re, representing a rounding pixel generated by the even scan line. These rounding pixels have half the height of normal pixels, but have the same width as normal elements. They are shifted horizontally by half the width of a normal pixel. The OSD generator will condition the display device to produce rounding pixels Ro and Re only when certain conditions, described below, are satisfied.

Figures 6A, 6B:
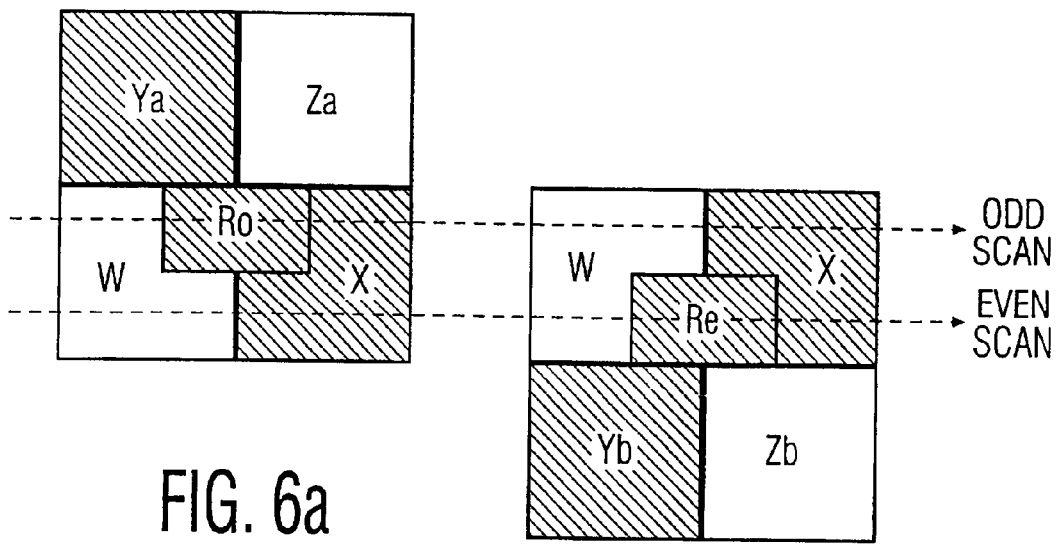

FIGS. 6(a) through 6(d) illustrate the conditions which must exist for an appropriate one of the two rounding pixels Ro or Re to be generated. FIG. 6(a) relates to edge detection and rounding during odd scan lines. For example, the condition illustrated in FIG. 6(a) calls for rounding pixel Ro to be generated when: (a) the color palette address vectors for pixels X and Ya are identical, that is pixels X and Ya are the same color (as indicated by the crosshatching); (b) the color palette address for that color is in address group 1 (of FIG. 3 or 4); and (c) the color palette address for pixel W is in address group 2. If the colors of pixels X and Ya are the same, this indicates that a diagonal edge from upper left to lower right between pixels X and Ya and the pixel W has been detected. As described above, if the address group of the addresses in the color palette for pixels X and Ya are in address group 1, and that for pixel W is in address group 2, this indicates that rounding is to occur. In this case, a rounding pixel Ro, having the same color as the X and Ya pixels (as indicated by the crosshatching), is generated. As illustrated in FIG. 6(a), the rounding pixel smooths the edge between pixels X and Ya, and pixel W. Otherwise, no rounding would occur.

FIG. 6(b) illustrates edge detection and rounding during even scan lines. The condition illustrated in FIG. 6(b) calls for rounding pixel Re to be generated when: (a) the color palette address vectors for pixels X and Yb are identical; (b) the addresses for those color vectors are in address group 1; and (c) the color palette address for pixel W is in address group 2. If the colors of pixels X and Yb are the same, this indicates that a diagonal edge from upper right to lower left between pixels X and Yb and pixel W has been detected. As described above, if the address group of the entry in the color palette for pixels X and Yb is in address group 1, and that for pixel W is in address group 2, this indicates that rounding is to occur. In this case, a rounding pixel Re, having the same color as the X and Yb pixels, is generated. As illustrated in FIG. 6(b), the rounding pixel smooths the edge between pixels X and Yb, and pixel W. Otherwise, no rounding would occur.

Figures 6C, 6D:
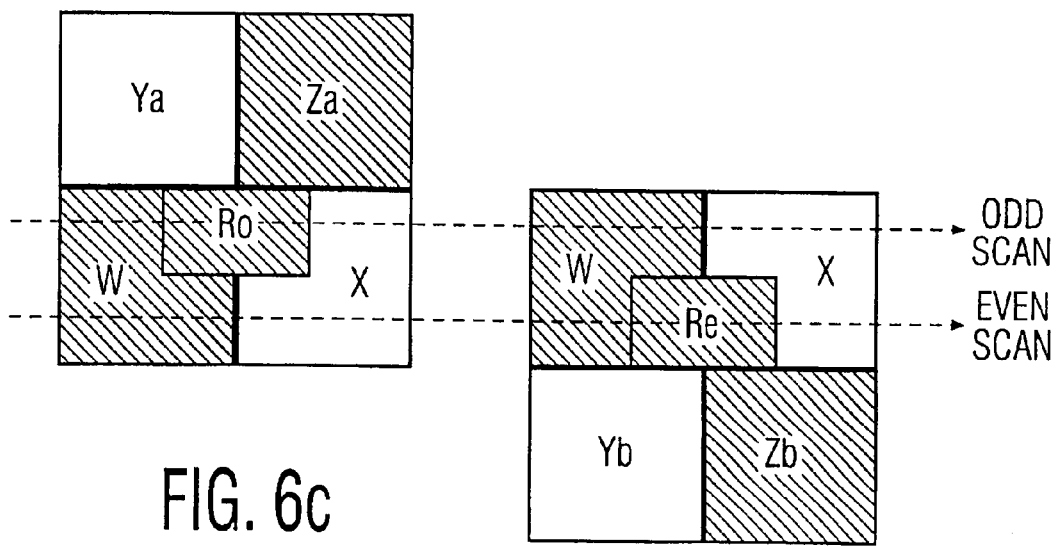

FIG. 6(c) also relates to edge detection and rounding during odd scan lines, but detects edges in the other direction from those detected by FIG. 6(a). The condition illustrated in FIG. 6(c) calls for rounding pixel Ro to be generated when: (a) the color palette address vectors for pixels W and Za are identical; (b) the color palette address for those pixels is in address group 1; and (c) the color palette address for pixel X is in address group 2. If the colors of pixels W and Za are the same, this indicates that a diagonal edge from upper right to lower left between pixels W and Za and the pixel X has been detected. As described above, if the address group of the entry in the color palette for pixels W and Za is in address group 1, and that for pixel X is in address group 2, this indicates that rounding is to occur. In this case, a rounding pixel Ro, having the same color as the W and Za pixels, is generated. As illustrated in FIG. 6(c), the rounding pixel smooths the edge between pixels W and Za, and pixel X. Otherwise, no rounding would occur.

FIG. 6(d), in turn, also relates to edge detection and rounding during even scan lines, but detects edges in the other direction from those detected by FIG. 6(b). The condition illustrated in FIG. 6(d) calls for rounding pixel Re to be generated when: (a) the color palette address vectors for pixels W and Zb are identical; (b) the color palette address for these pixels is in address group 1; and (c) the color palette address for pixel X is in address group 2. If the colors of pixels W and Zb, are the same, this indicates that a diagonal edge from upper left to lower right between pixels W and Zb and the pixel X has been detected. As described above, if the address group of the entry in the color palette for pixels W and Zb is in address group 1, and that for pixel X is address group 2, this indicates that rounding is to occur. In this case, a rounding pixel Re, having the same color as the W and Zb pixels, is generated. As illustrated in FIG. 6(d), the rounding pixel smooths the edge between pixels W and Za, and pixel X. Otherwise, no rounding would occur.

Referring to FIGS. 6(a) and (c), it may be seen that during odd scan lines the address vectors of only upper adjacent pixels (Ya and Za) are compared to pixels in the current scan line (W and X). Referring to FIGS. 6(b) and (d), during even scan lines the address vectors of only lower adjacent pixels (Yb and Zb) are compared to pixels in the current scan line (W and X). The four rules illustrated in FIGS. 6(a)–(d) may, thus, be consolidated into two. The first rule relates to detecting edges between pixels X and Y (Ya during odd scan lines, and Yb during even scan lines) and pixel W, and is illustrated in FIGS. 6(a) and (b). This rule is: if (a) the color palette vector for pixel X is identical to that for pixel Y, (b) the color palette address for these pixels is in address group 1; and (c) the color palette vector for pixel W is in address group 2, then a rounding pixel is generated. The second rule relates to detecting edges between pixels W and Z (Za during odd scan lines, and Zb during even scan lines), and pixel X, and is illustrated in FIGS. 6(c) and (d). This rule is: if (a) the color palette vector for pixel W is identical to that for pixel Z, (b) the color palette address for these pixels is in address group 1, and (c) the color palette vector for pixel X is in address group 2, then a rounding pixel is generated.

Referring again to FIG. 6, the rounding pixels Ro and Re in the illustrated embodiment have the same width as normal, full-size, pixels, but are only a single scan line in height, or ½ the height of a normal pixel. Even though the rounding pixels Ro and Re have the width of a full-size pixel, they are displaced horizontally by one half the width of a full size pixel, and, thus, partially overlap the adjacent full-size pixel of the same color. The half which overlaps the adjacent full size pixel will, therefore, not be visible, and not materially change the display. Such an arrangement can simplify the hardware necessary to implement an OSD generator according to the present invention.

Figure 7:
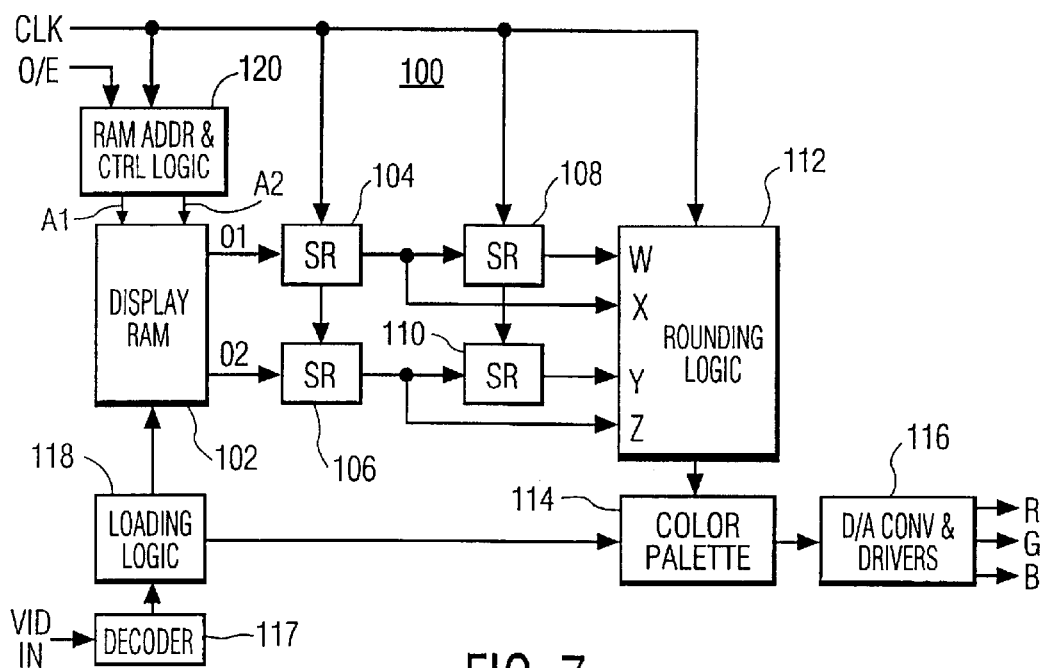
FIG. 7 is a block diagram of a portion of an OSD controller according to the present invention.

FIG. 7 is a block diagram of a portion of an OSD controller 100 according to the present invention. In FIG. 7, a display RAM 102 has a first output terminal coupled to an input terminal of a first 4-bit shift register 104, and a second output terminal coupled to an input terminal of a second 4-bit shift register 106. An output terminal of the first shift register 104 is coupled to an input terminal of a third 4-bit shift register 108, and to an X input terminal of a rounding logic circuit 112. An output terminal of the third shift register 108 is coupled to a W input terminal of the rounding logic circuit 112. An output terminal of the second shift register 106 is coupled to an input terminal of a fourth 4 bit shift register 110, and a Z input terminal of the rounding logic circuit 112. An output terminal of the fourth shift register 110 is coupled to a Y input terminal of the rounding logic circuit 112.

An output terminal of the rounding logic 112 is coupled to an input terminal of a color palette memory 114. An output terminal of the color palette 114 is coupled to an input terminal of a digital-to-analog (D/A) converter and display device driver circuit 116. Respective output terminals of the D/A converter and display driver circuit 116 produce color signals R, G and B. These signals may be combined with other R, G and B color signals, e.g., from a television receiving circuit (not shown) and representing a received television video signal, and the combination coupled to a display device (also not shown) which can reproduce the combined image represented by these signals.

Decoder 117 extracts data such as closed caption data and graphics data from an auxiliary information component of a video signal VID IN. Signal VID IN may be an analog television signal such as an NTSC compatible signal or a digital video signal such as a digital direct broadcast satellite signal such as that provided by the DirecTV® service. In an NTSC signal, the auxiliary information component may be included in line intervals within vertical blanking in an NTSC compatible signal. In a digital video signal such as a digital broadcast satellite signal, the auxiliary information component may be included in data packets associated with an auxiliary information data stream. Decoder 117 and some or all of the other features shown in FIG. 7 may be included in an integrated circuit such as a microcontroller or microcomputer.

Also in FIG. 7, a loading logic circuit 118 has an input coupled to receive data such as graphics data extracted from an auxiliary information component by decoder 117. Loading logic circuit 118 has respective output terminals coupled to corresponding write control input terminals of the display RAM 102 and the color palette 114. A RAM address and control logic circuit 120 is coupled to read control input terminals and to first and second address input terminals of the display RAM 102. A clock input terminal is coupled to a source (not shown) of clock signals synchronized to the received television signal. These clock signals include signals synchronized to the synchronization component of the received television signal, and a pixel (dot) display clock. The clock input terminal is coupled to respective clock input terminals of the RAM address and control logic circuit 120, the first, second, third and fourth shift registers, 104, 106, 108, 110, respectively, and the rounding logic circuit 112. The clock input terminal may be coupled to other elements illustrated in FIG. 7, or other elements not illustrated in the OSD controller 100.

In operation, the television receiver in which the OSD generator 100 of FIG. 7 is embodied receives graphical OSD image data (e.g. pixel color data and/or color palette data) from the received television signal via decoder 117, and stores (or loads) color palette data to the color palette 114 and pixel color vector data representing that OSD image to predetermined locations in the display RAM 102, under the control of the loading logic 118. As described above and illustrated in FIG. 6, the OSD generator 100 illustrated in FIG. 7 analyzes the pixel color vectors for four adjacent pixels: W, X, Ya or Yb, and Za or Zb. The OSD generator 100, thus, requires that four four-bit color palette address vectors associated with pixels W, X, and either Ya and Za during odd scans or Yb and Zb during even scans be simultaneously available. The RAM address and control logic circuit 120 generates two multi-bit address signals A1 and A2 which are supplied to the display RAM 102.

The first address signal A1 is generated by a first counter (not shown) in the RAM address and control logic circuit 120 clocked by the pixel clock signal. This signal conditions the display RAM 102 to retrieve the current pixel from its location in the display RAM 102. The second address signal A2 is generated by a second counter (also not shown) and conditions the display RAM 102 to retrieve a pixel vertically adjacent to the current pixel from its location in the display RAM 102. The RAM address and control logic circuit 120 is further responsive to signal O/E from the synchronization circuit of the television receiver (not shown) specifying whether the current scan line is an odd scan line or an even scan line. During odd scan lines, the second address signal A2 conditions the display RAM 102 to retrieve the vertically adjacent pixel from the line above the current line. During even scan lines, the second address signal A2 conditions the display RAM 102 to retrieve the vertically adjacent pixel from the line below the current line.

The pixel data from the current line is produced at the first output terminal 01 of the display RAM 102 which is coupled to the first shift register 104. The pixel data from the appropriate vertically adjacent scan line (above for odd scan lines, below for even scan lines) is produced at the second output terminal 02 of the display RAM 102 which is coupled to the second shift register 106. The first and second shift registers 104 and 106 operate to buffer the retrieved pixels from the display RAM 102. If the output signals directly from the display RAM 102 have sufficient drive capacity and have proper timing, then arrangements other than that depicted in FIG. 7 may be used. For example, RAM output signals having appropriate drive and timing characteristics may permit the first and second shift registers, 104 and 106 to be omitted and the output of the display RAM 102 coupled directly to appropriate input terminals of the third and fourth shift registers 108 and 110, and the rounding logic 112.

The output terminals of the first and second shift registers, 104 and 106, produce a buffered and pipelined version of the current, next horizontal and corresponding vertically adjacent pixels. Referring to FIGS. 5 and 6, these pixels are the X pixel and Z pixel (Za for odd scan lines, and Zb for even scan lines), respectively. The third and fourth shift registers, 108 and 110, respectively, produce pixels delayed by one pixel time interval. These pixels are the W pixel and the Y pixels (Ya for odd scan lines and Yb for even scan lines). The first, second, third and fourth shift registers, 104, 106, 108, and 110, respectively, in combination, extract the pixel color vector data from the appropriate locations in the display RAM 102 and make this data simultaneously available to the rounding logic circuit 112.

The rounding logic circuit 112 analyzes the W, X, Y and Z pixel data from the display RAM 102 via shift registers 104, 106, 108 and 110, in a manner that is depicted in FIG. 6 and described in more detail below. The rounding logic circuit 112 then generates control signals for the color palette 114. The control signals condition the color palette to generate color signals representing the received graphic image plus rounding pixels where appropriate. The color palette 114, in turn, is responsive to the control signals from the rounding logic circuit 112 to generate the appropriate color signals R, G and B. These color signals may be combined with the R, G and B signals representing the received television program image to generate a combined image.

Figure 8:
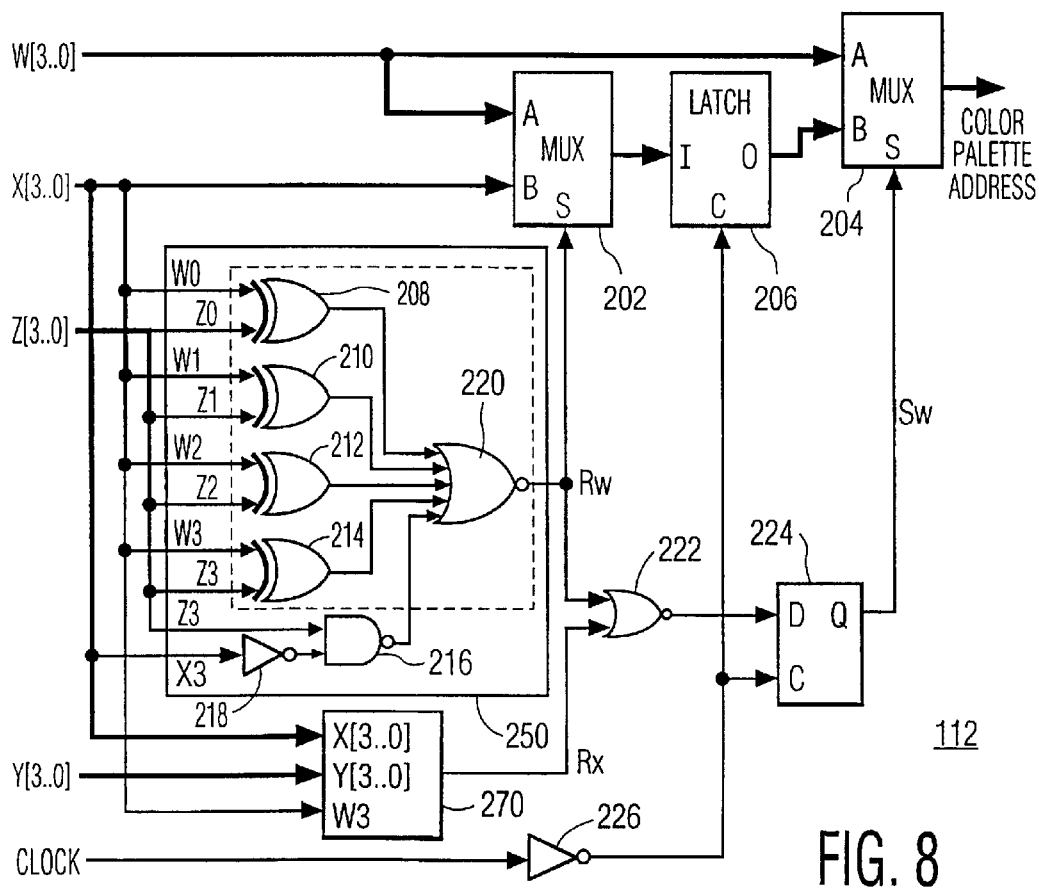
FIG. 8 is a more detailed diagram partially in block form and partially in logic form illustrating an embodiment of a portion of the OSD controller illustrated in FIG. 7.

FIG. 8 is a more detailed diagram partially in block form and partially in logic form illustrating an embodiment of the rounding logic circuit 112 illustrated in FIG. 7. In FIG. 8, thicker lines represent multi-bit digital signal lines, and thin lines represent single bit digital signal lines or dock signal lines. FIG. 8 shows the gate configuration of the rounding logic circuit 112 which determines whether one of the rounding elements Ro or Re (as illustrated in FIG. 6) should be generated based on the W, X, Y and Z pixel data.

FIG. 8, the W, X, Y and Z input terminals receive respective four bit color palette address signals, W[3..0], X[3..0], Y[3..0] and Z[3..0] for the W, X, Y and Z pixels. All four bits of the W input terminal are coupled to a first data input terminal A of a first multiplexer 202, and a first data input terminal A of a second multiplexer 204. All four bits of the X input terminal are coupled to the second data input terminal B of the first multiplexer 202. An output terminal of the first multiplexer 202 is coupled to an input terminal I of a latch 206. An output terminal O of the latch 206 is coupled to a second data input terminal B of the second multiplexer 204. An output terminal of the second multiplexer 204 is coupled to an output terminal of the rounding logic circuit 112, which, in turn, is coupled to the control input terminal of the color palette 114 (of FIG. 7).

The least significant bit of the W input terminal W0 is coupled to a first input terminal of a first exclusive-OR (XOR) gate 208, and the least significant bit of the Z input terminal Z0 is coupled to a second input terminal of the first XOR gate 208. Similarly, bits W1 and Z1 are coupled to respective input terminals of a second XOR gate 210, bits W2 and Z2 are coupled to respective input terminals of a third XOR gate 212 and bits W3 and Z3 are coupled to respective input terminals of a fourth XOR gate 214. The most significant bit of the Z pixel Z3 is also coupled to a first input terminal of a negative output AND (NAND) gate 216. The most significant bit of the X pixel X3 is also coupled to an input terminal of an inverter 218. An output terminal of the inverter 218 is coupled to a second input terminal of the NAND gate 216.

Respective output terminals of the first, second, third and fourth XOR gates 208–214, and the NAND gate 216 are coupled to corresponding input terminals of a five input negative output OR (NOR) gate 220. The combination of the first, second, third and fourth XOR gates 208–214, the NAND gate 216, the inverter 216 and the NOR gate 220 form a first combinatorial logic circuit 250, which takes as inputs the four bit W and Z pixel data signals and the most significant bit of the X pixel, and produces a single bit output signal Rw from the NOR gate 220.

An output terminal of the NOR gate 220 is coupled to a first input terminal of a two input negative output OR (NOR) gate 222 and to a selection input terminal of the first multiplexer 202. An output terminal of the NOR gate 222 is coupled to a D input terminal of a D flip-flop 224. A Q output terminal of the D flip-flop 224 is coupled to a selection control input terminal S of the second multiplexer 204.

A second combinatorial logic circuit 270 is structured identically to the first combinatorial logic circuit 250, and is illustrated only by a block in FIG. 8. The X and Y input terminals are coupled to respective first and second input terminals and the most significant bit of the X input terminal, X3 is coupled to a third input terminal of the second combinatorial logic circuit 250. An output terminal of the second combinatorial logic circuit 270 produces a signal Rx, which is coupled to a second input terminal of the NOR gate 222. A clock signal input terminal is coupled to an input terminal of a second inverter 226. An output terminal of the second inverter 226 is coupled to respective clock input terminals of the D flip-flop 224 and the latch 206.

In operation, the pair of combinatorial logic circuits 250 and 270, respectively, include a four bit equality detector (indicated in phantom in FIG. 8), formed by the first, second, third and fourth XOR gates, 208–214, and the NOR gate 220 (of 250), for two pixel color palette addresses; and a single bit comparator, formed by the inverter 218, NAND gate 216 and NOR gate 220 (of 250), for determining if the color palette address groups of the two pixels being compared is in address group 1 and that of the spatially adjacent pixel is in address group 2 (as illustrated in FIG. 6). Referring to the first combinatorial logic circuit 250, if the W0 bit is equal to the Z0 bit, the first XOR gate 208 produces a logic '0' signal, otherwise it produces a logic '1' signal. The second, third and fourth XOR gates 210–214 operate similarly. If all the corresponding bits of the W pixel and the Z pixel are all the same, i.e., the W pixel is the same color as the Z pixel, all four XOR gates 208–214 produce logic '0' signals.

Referring again to FIGS. 3 and 4, the most significant bit of the color palette address for a pixel is an indication of which address group that pixel belongs to. If the most significant bit (bit 3) of the color palette address is a logic '0' signal, the address is in the range of 0–7, and the pixel is in address group 2. If the most significant bit of the color palette address is a logic '1' signal, the address is in the range of 8–F and the pixel is in address group 1.

Referring again to FIG. 8, as described above, if the color palette address for the X pixel is in address group 2 while that of the W and Z pixels is in address group 1, then rounding is to occur, otherwise no rounding is to occur. The combination of the inverter 218 and the NAND gate 216 generate a logic '0' signal when the most significant bit Z3 of the Z pixel is a logic '1' signal, indicating that the color palette address of the Z pixel is in address group 1 and the most significant bit X3 of the X pixel is a logic '0' signal, indicating that the color palette address of the X pixel is in address group 2. As described above, this indicates that rounding is to occur. Otherwise, the combination of the inverter 218 and NAND gate 216 produce a logic '1' signal.

The NOR gate 220 produces a logic '1' signal, Rw, when the signals from the first, second, third and fourth XOR gates 208–214 and the NAND gate 216 are all logic '0' signals, indicating that the W and Z pixels are of the same color and in address group 1, and that the color palette address of the X pixel is in address group 2. This corresponds to the conditions illustrated in FIG. 6(c) during odd scan lines and FIG. 6(d) during even scan lines. This indicates that a rounding pixel is to be generated. Otherwise, the NOR gate 220 produces a logic '0' signal, indicating that no rounding pixel is to be produced.

The combinatorial logic circuit 270 operates similarly to produce a logic '1' signal Rx when the signals from its first, second, third and fourth XOR gates (not shown) and its NAND gate (also not shown) are all logic '0' signals, indicating that the X and Y pixels are of the same color and in address group 1, and that the color palette address of the W pixel is in address group 2. This corresponds to the conditions illustrated in FIG. 6(a) during odd scan lines and FIG. 6(b) during even scan lines. This indicates that a rounding pixel is to be generated. Otherwise, its NOR gate (also not shown) produces a logic '0' signal, indicating that no rounding pixel is to be produced. The combinatorial logic circuits 250 and 270, thus, detect the presence of an edge in the graphical OSD image, and determine whether a rounding pixel is to be generated to smooth that edge.

The remaining portion of the rounding logic circuit 112 illustrated in FIG. 8 operates to generate the rounding pixel when necessary. Referring again to FIG. 6, when a logic '1' Rw signal is generated by combinatorial logic circuit 250 (FIGS. 6(c) and (d)), the rounding pixel has the same color as the W pixel. When a logic '1' Rx signal is generated by the combinatorial logic circuit 270, the rounding pixel has the same color as the X pixel. When the Rw signal is a logic '1' signal, the first multiplexer 202 is conditioned to couple the W input terminal to its output terminal, and when the Rw signal is a logic '0' signal, the first multiplexer 202 is conditioned to couple the X input terminal to its output terminal. The output terminal of the first multiplexer 202, thus, produces a signal representing the color a rounding pixel is to have, should one be necessary.

Figure 9:
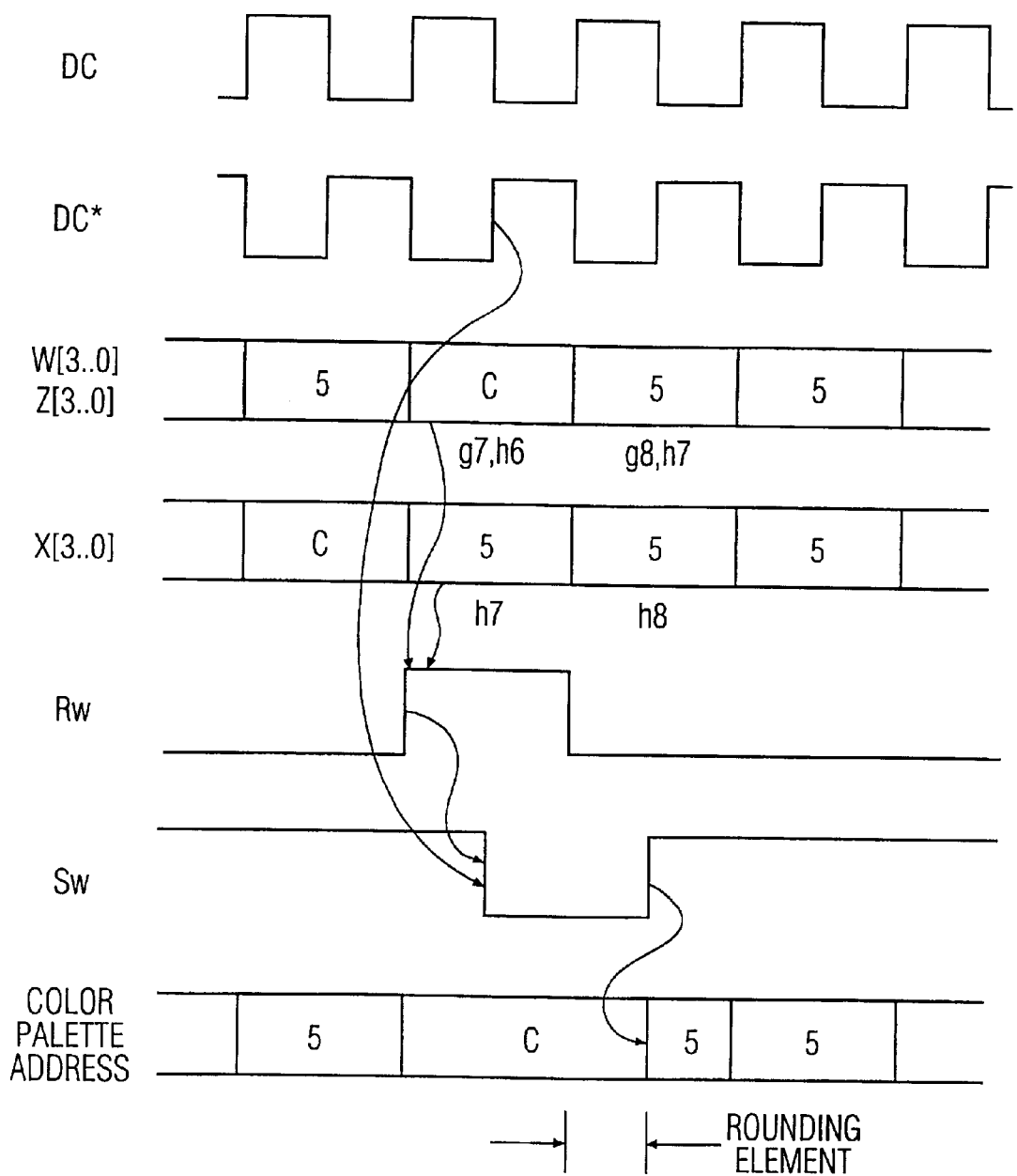
FIG. 9 is a waveform diagram useful in understanding the operation of the portion of the OSD generator illustrated in FIG. 8.

FIG. 9 is a waveform diagram useful in understanding the operation of the remainder of the rounding logic circuit 112 illustrated in FIG. 8. In the example described by the waveforms in FIG. 9, the appropriate conditions for signal Rw to become active for one pixel period are shown. This corresponds to the neighborhood surrounding pixel h7 (of FIG. 1). The topmost waveform DC in FIG. 9 is the pixel, or dot, clock from the clock input terminal of the rounding logic circuit 112 (of FIG. 8). As can be seen from FIG. 9, a new pixel is produced at each rising edge of the dot clock signal DC. The second waveform DC* in FIG. 9 is the inverted dot clock DC from the second inverter 226.

The third waveform is the W and the Z pixel stream. Each sequential pixel in the pixel stream is represented by a rectangle. The hexadecimal number in the rectangle is the color palette address describing the color of that pixel. The coordinates beneath some of the illustrated pixels identify the corresponding pixel in the image illustrated in FIG. 1. Under general conditions, the two pixel streams W and Z need not be identical. However, in the present example, the W and Z pixel streams in the exemplary neighborhood of FIG. 1 are identical and are represented in FIG. 9 by a single waveform. The fourth waveform is the X pixel stream illustrated in the same manner as the W and Z pixel streams.

The fifth waveform is the output signal Rw from the NOR gate 220 (of FIG. 8). The sixth waveform is the output signal Sw from the D flip-flop 224. The seventh waveform is color palette address signal supplied to the color palette 114 from the output terminal from the second multiplexer 204.

Normal operation, i.e., when no rounding pixels are being generated, is illustrated in the first full pixel period of FIG. 9. During normal operations, the output signals from the first and second combinatorial logic circuits 250 and 270 are both logic '0' signals. The output signal from the NOR gate 222, thus is a logic '1' signal. The logic '1' signal from the NOR gate 222 is passed through the D flip-flop 224 at the rising edge of the inverted dot clock signal DC*. In response to the delayed logic '1' signal from the Q output terminal of the D flip-flop 224, the second multiplexer couples its first input terminal A, carrying the signals representing the W pixel, to its output terminal. Thus, during normal operation, the signal supplied to the color palette 114 is that representing the W pixel, in a pipelined manner.

For the following explanation, it is assumed that the current scan line is an odd scan line. Referring now to the waveforms in FIG. 9 and the image portions illustrated in FIG. 1 and FIG. 6(c), at the second full pixel period illustrated in FIG. 9, the color palette address for both the W and Z pixel is C, i.e. color 1 (double crosshatched), and the color palette address for the X pixel is 5, i.e. color 2 (single crosshatched). Referring to FIG. 1, this occurs when the current pixel W is pixel h6, the next pixel X is h7 and the appropriate vertically adjacent pixel Z is from the line above the current line and is pixel g7. This location is outlined by thick lines in FIG. 1, and corresponds to FIG. 6(c).

Because the W and Z pixels have the same color palette address, i.e., address C, the first, second, third and fourth XOR gates, 208, 210, 212 and 214, all generate logic '0' signals. Because the W and Z pixels are in address group 1 (i.e. address C) and the pixel X is in address group 2 (i.e. address 5), the NAND gate 216 also produces a logic '0' signal. Thus, the NOR gate 220 produces a logic '1' signal for signal Rw, as illustrated in FIG. 9. As described above, this conditions the first multiplexer 202 to couple the W pixel signal to its output terminal. The latch 206 is clocked by the inverted pixel (dot) clock DC* one-half pixel period later. The W pixel signal remains at the output terminal of the latch until the middle of the next pixel period.

Simultaneously, the NOR gate 222 generates a logic '0' signal. At the next leading edge of the inverted dot clock signal DC*, the logic '0' signal from the NOR gate 222 is clocked through the D flip-flop 224, illustrated as waveform Sw in FIG. 9. The Sw signal conditions the second multiplexer to couple its A input terminal, coupled to the output of the latch 206 and having the value C, to its output terminal. The Sw signal remains a logic '0' signal until the next leading edge of the inverted dot clock signal DC* at which time, the output from the NOR gate 222 is a logic '1' signal. This conditions the second multiplexer to couple the signal from the W pixel input terminal to its output terminal, and normal operation resumes.

As a result, the color of the rounding pixel, stored at address C in the color palette, is "stretched" half-way into the next pixel of the color stored at address 5. A single rounding element has thus been generated, and the resulting pattern is illustrated in the portion of FIG. 2 corresponding to the outlined portion of FIG. 1, and in FIG. 6(c).

The figures and corresponding detailed description above illustrate and describe one embodiment which can produce the advantageous rounded edges in a graphical OSD display. However, one skilled in the art will understand that other embodiments may be designed and fabricated which perform the same image enhancement of the received OSD image data.

What is claimed is:

1. A graphical on-screen display (OSD) system, comprising:

a memory having a first group of memory locations for storing data representing a first group of colors and having a second group of memory locations for storing data representing a second group of colors, data representing a first color being stored in each of the first and second groups of memory locations;

a decoder for extracting graphical OSD image representative data included in an auxiliary information component of a television signal, the graphical OSD image representative data comprising data representing addresses of locations in the memory for indicating colors of pixels in a graphical OSD image;

an edge detector for processing the OSD image representative data for detecting an edge in the graphical OSD image between a first group of pixels of the first color and a second group of pixels of a second color, and an edge smoother coupled to the decoder and the edge detector for generating a signal representing the OSD image having a smoothed edge in response to the first and second colors being represented by data stored in a first arrangement of the first and second groups of memory locations, and for generating a signal representing the OSD image without a smoothed edge in response to the first and second colors being represented by data stored in a second arrangement of the first and second groups of memory locations.

2. The system of claim 1, wherein the first arrangement of the first and second groups of memory locations corresponds to said first and second colors being represented by data stored in different ones of the first and second groups of memory locations, and the second arrangement of the first and second groups of memory locations corresponds to the first and second colors being represented by data stored in the same one of the first and second groups of memory locations.

3. The system of claim 2 wherein:
the graphical OSD image is comprised of an array of pixels, and the graphical OSD image representative data contains data values representing respective pixels in the graphical OSD image;
the system further comprises circuitry, coupled to the decoder, for simultaneously producing respective data values representing two adjacent pixels included in one of the first and second groups of pixels and forming the edge, and a pixel included in the other one of the first and second groups of pixels and adjacent the two edge forming pixels; and
circuitry for determining when it is desired to smooth a detected edge comprising:
a comparator, coupled to the data value producing circuit, for comparing the data values representing the two edge forming pixels to the data value representing the pixel adjacent the two edge forming pixels, and producing a signal when the data values representing the two edge forming pixels and the data value representing the pixel adjacent the two edge forming pixels meet a predetermined criterion; and
circuitry, coupled to the data value producing circuit and the comparator, for generating a signal representing a rounding pixel when the data values representing the two edge forming pixels and the data value representing the pixel adjacent the two edge forming pixels meet the predetermined criterion.

4. The system of claim 3 wherein the rounding pixel representative signal generator comprises circuitry, coupled to the data value producing circuit and the comparator, for generating the rounding pixel representative signal having the data value of one of the two edge producing pixels.

5. The system of claim 3 wherein each pixel in the array of pixels has a predetermined height and width, and the rounding pixel representative signal generator comprises circuitry, coupled to the data value producing circuit and the comparator, for generating the rounding pixel representative signal having one-half the height of the pixels in the array of pixels, the width of the pixels in the array of pixels, and being shifted one half a pixel width in the array of pixels.

6. The system of claim 3 wherein:
the memory comprises a color palette, coupled to the decoder and the edge smoother, for generating a signal representing the color of respective pixels in the reproduced OSD image;
the graphical OSD image representative data values are addresses pointing to entries in the color palette, wherein the addresses are partitioned into first and second address groups corresponding to the first and second groups of memory locations;
the comparator compares the address group of the data values representing the two edge forming pixels to the address group of the data value representing the pixel adjacent the two edge forming pixels, and produces the criterion indicative signal when the address group of the data values representing the two edge forming pixels is in one of the first and second address groups, and the address group of the data value representing the pixel adjacent the two edge forming pixels is in the other one of the first and second address groups.

7. The system of claim 6 wherein:
the data values are multi-bit digital data values having a most significant bit, and the color palette addresses are partitioned into a first address group in which the most significant bit is a logic '1' signal, and a second address group in which the most significant bit is a logic '0' signal; and
the comparator comprises circuitry for comparing the most significant bit of the data value representing one of the two edge forming pixels and the most significant bit of the pixel adjacent the two edge forming pixels.

8. A method for producing signals representing a reproduced graphical on-screen display (OSD) image, comprising the steps of:
storing data representing a first group of colors including a first color in a first group of memory locations;
storing data representing a second group of colors including the first color in a second group of memory locations;
extracting graphical OSD image representative data from an auxiliary information component of a video signal, the graphical OSD image representative data comprising data representing addresses of the memory locations for indicating colors of pixels in a graphical OSD image;
processing the graphical OSD image representative data to detect an edge in the graphical OSD image between a first group of pixels of the first color and a second group of pixels of a second color; and
producing a signal representing the graphical OSD image with a smoothed edge in response to the first and second colors being represented by data stored in a first arrangement of the first and second groups of memory locations, and without a smoothed edge in response to the first and second colors being represented by data stored in a second arrangement of the first and second groups of memory locations.

9. The method of claim 8 wherein the first arrangement of the first and second groups of memory locations corresponds to said first and second colors being represented by data stored in different ones of the first and second groups of memory locations, and the second arrangement of the first and second groups of memory locations corresponds to the first and second colors being represented by data stored in the same one of the first and second groups of memory locations.

10. The method of claim 9, wherein the graphical OSD image is comprised of an array of pixels, and the received graphical OSD representative data contains data values representing respective pixels in the graphical OSD image; and further comprising the step of determining if it is desired to produce a rounded edge including the steps of:
comparing respective data values representing two adjacent pixels forming an edge, and a third pixel adjacent the two edge forming pixels; and
if the respective data values meet a predetermined criterion, determining that a rounded edge is desired.

11. The method of claim 10, wherein the data values are addresses pointing to entries in a color palette containing data representing the desired colors for each of the respective pixels; the addresses of the color palette entries are partitioned into first and second address groups corresponding to the first and second groups of memory locations; and the step of comparing the respective data values comprises the steps of:
comparing the address group of the data values representing the two adjacent pixels to the address group of the data value representing the third pixel; and
if the data values representing the two adjacent pixels are in one of the first and second address groups, and the data value representing the third pixel is in the other of the first and second address groups, determining that it is desired to produce a rounded edge.

12. The method of claim 11 wherein each pixel in the array of pixels has a predetermined height and width, and the smoothed edge producing step comprises the steps of producing a smoothing pixel, having one-half the height and one-half the width of the pixels in the array of pixels.

* * * * *